United States Patent
Watanabe et al.

(10) Patent No.: US 7,881,580 B2
(45) Date of Patent: Feb. 1, 2011

(54) OPTICAL WAVEGUIDE DEVICE AND MANUFACTURING METHOD FOR OPTICAL WAVEGUIDE DEVICE

(75) Inventors: Shinya Watanabe, Tokyo (JP); Mitsuru Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/051,917

(22) Filed: Mar. 20, 2008

(65) Prior Publication Data
US 2008/0304802 A1 Dec. 11, 2008

(30) Foreign Application Priority Data
Mar. 23, 2007 (JP) ............... 2007-077566

(51) Int. Cl.
G02B 6/10 (2006.01)
G02B 6/38 (2006.01)
G02B 6/40 (2006.01)

(52) U.S. Cl. ............. 385/129; 385/52; 385/88; 385/91

(58) Field of Classification Search ............ None
See application file for complete search history.

(56) References Cited

U.S. PATENT DOCUMENTS

| | | | | |
|---|---|---|---|---|
| 5,898,806 | A * | 4/1999 | Nishimoto | 385/49 |
| 5,909,524 | A * | 6/1999 | Tabuchi | 385/49 |
| 6,222,967 | B1 * | 4/2001 | Amano et al. | 385/49 |
| 6,256,437 | B1 * | 7/2001 | Sakushima et al. | 385/49 |
| 6,553,171 | B1 | 4/2003 | Takahashi et al. | |

FOREIGN PATENT DOCUMENTS

| | | |
|---|---|---|
| EP | 1291692 A1 | 3/2003 |
| JP | 2002062447 A | 2/2002 |
| WO | 2004008201 A2 | 1/2004 |
| WO | 2005066677 A2 | 7/2005 |

OTHER PUBLICATIONS

European Search Report for Application No. 08102509.0, search completed Jun. 27, 2008.

* cited by examiner

*Primary Examiner*—Charlie Peng
*Assistant Examiner*—Mary A El Shammaa

(57) ABSTRACT

To obtain an optical waveguide device capable of improving mounting accuracy and productivity for correcting misalignment of alignment marker caused by distortion due to a substrate stressed and distorted. An optical waveguide device includes an optical waveguide section, including a waveguide core formed on a substrate, and an optical device (LD) mounted on the substrate to correspond the optical waveguide section, both of which are coupled at a light end face and mounted by hybrid mounting. LD side alignment markers are provided in both sides of an active line in the optical device. Substrate side alignment markers are provided at positions where centers thereof and those of the optical device side markers are matched when the optical device is mounted on the corresponding substrate. Fiducial markers are provided and a relative positional relationship with the waveguide core on the substrate becomes stably. Thus, a misalignment amount is detected.

13 Claims, 15 Drawing Sheets

OPTICAL WAVEGUIDE DEVICE AND MANUFACTURING METHOD FOR OPTICAL WAVEGUIDE DEVICE

CROSS-REFERENCE TO RELATED APPLICATION

This application is based upon and claims the benefit of priority from Japanese patent application No. 2007-077566, filed on Mar. 23, 2007, the disclosure of which is incorporated herein in its entirety by reference.

BACKGROUND OF THE INVENTION

1. Field of the Invention

The present invention relates to an optical waveguide device and the like, in particular, to an optical waveguide device and a manufacturing method for an optical waveguide device with which accuracy and productivity improves when an optical device is mounted on a corresponding position of an optical waveguide.

2. Description of the Related Art

An optical transceiver used in an optical access market includes a module in a micro-optics type composed of an LD, a PD, a thin film filter, a lens, and the like, and a PLC module composed of a silica waveguide formed on a silicon substrate which is further mounted with an LD and a PD by hybrid mounting. The both have advantages and disadvantages. However, the latter is more advantageous in terms of a cost and delivery because it is less complicated than the former that needs to align optical axes of each component with monitoring an optical output. The latter utilizes a technique generally called passive alignment for the hybrid mounting.

In the passive alignment, a positional accuracy of a mounting component in a planar direction with respect to an optical waveguide section is secured by recognizing an image of an alignment marker formed on the mounting component. In addition, a positional accuracy in a vertical direction is secured according to a platform formed on the substrate. Since the height of this platform can be formed with high accuracy, a height thereof can be aligned with a height of the optical waveguide with high accuracy by only mounting the optical device on the platform.

FIGS. 12 and 13 show examples of an optical waveguide device constructed with the passive alignment. In the example shown in FIG. 12, an optical waveguide device 50 formed in a planar shape includes an optical waveguide forming section 56 formed on a substrate 51 made of silicon crystal, and an optical device mounting section 57 provided in response to the above. The optical waveguide forming section 56 is composed of an optical waveguide section 55 including a base layer 521, a lower cladding layer 522, an optical waveguide core 53, and an upper cladding layer 54, formed on the silicon substrate 51.

In addition, the optical device mounting section 57 is composed of an optical device 58 mounted so as to be coupled optically with an end face (a left end face in FIG. 13) of the optical waveguide core 53 which is exposed because the optical waveguide forming layer 55 is partially removed, and four platform blocks 59 for setting the height of the optical device 58 with high accuracy. Top end faces of each platform block 59 include chromium films 61. A semiconductor laser chip (LD) is used as the optical device 58. The optical device 58 is fixed on the platform blocks 59 in a condition where optical axes of an active layer 58A in the optical device 58 and the optical waveguide core 53 in the optical waveguide section 55 are aligned.

The optical device mounting section 57 includes the aforementioned platform blocks 59 formed with a same film as the base layer 521, and marker tables 60 provided with alignment markers (made of a chromium film, two of them are formed in right and left sides) on the top end face for adjusting a position. The platform blocks 59 are patterned from the same film with the base layer 521, so that the platform blocks 59 and the base layer 521 are in the same height. When the optical device 58 is mounted, the optical device 58 is supported on the platform blocks 59. The base layer 521, the lower cladding layer 522, the optical waveguide core 53, and the upper cladding layer 54 are formed with a CVD respectively.

Meanwhile, an alignment of the optical device 58 in the planar direction is performed by using two of the substrate side alignment markers 62 provided in the right and left sides in the optical device mounting area 57. The alignment marker tables 60 holding the substrate side alignment markers 62 is in a cylindrical shape, and fix the substrate side alignment markers 62 made of a metal film (a chromium film) thereon. A center position of the circle on the top surface of the substrate side alignment marker 62 is adjusted with high accuracy based on a position of the waveguide core 53 in the optical waveguide section 55.

As shown in FIG. 13, there are two of optical device side alignment markers 58a provided in a bottom surface of the optical device 58, corresponding to the substrate side alignment markers 62. The optical device side alignment markers 58a are, as shown in FIG. 14, formed as a metal film pattern in a circular punched shape, and the centers of the circles are arranged in the right and left sides and aligned with high accuracy based on a position of the active layer 58A in the optical device 58. Further, positions of the optical device side alignment markers 58a and the substrate side alignment markers 62 are specified so that the optical device 58 is placed in a right position to be fixed when the centers of those optical device side alignment markers 58a and the substrate side alignment markers 62 are matched with each other.

When the optical device 58 is actually mounted as shown in FIGS. 12 and 13, the metal film patterns in the optical device 58 side (the optical device side alignment markers 58a) and the substrate side alignment markers 62 are superimposed by the image recognition as shown in FIG. 14. In this case, infrared light is emitted from the substrate 51 side, as shown in FIG. 13, and a monitoring camera 52 disposed upward monitors transmitted light. Consequently, images as shown in FIG. 14 can be obtained because the metal part shields the infrared light.

The diagram in the left side in FIG. 14 shows a case in which the center axes of the substrate side alignment markers 62 and the LD side alignment markers 58a are not aligned with each other on the substrate 51 when the optical device 58 is going to be mounted. Further, the diagram in the right side in the same figure shows a case in which the center axes of the substrate side alignment markers 62 and the LD side alignment markers 58a are aligned.

Each position of the substrate side and the optical device side alignment markers 62, 58a are specified with high accuracy with respect to the positions of the waveguide core 53 in the optical waveguide section 56 and the active layer 58A of the optical device, respectively. Therefore, if the optical device is mounted on a position where the center of the circles for both are aligned, optical axes of the active layer 58A and the optical waveguide core 53 in the planar direction can be aligned with high accuracy.

As for the optical waveguide device of this type, a technique disclosed by Japanese Patent Application Laid-open No. 2002-062447 (Patent Document 1) has been known. In the technique, as alignment markers, short linear markers parallel to the optical axis are formed at the position where each end face of the optical waveguide section and the optical device section are abutted, and alignment is performed at the position the markers are abutted and matched. According to the technique, the optical waveguide section and the optical device section can be aligned while both are abutted. Therefore, the alignment can be performed by the adjustment in a direction along with the end faces of those only, and two-dimensional alignment is not required.

As shown FIGS. 12 and 13 with respect to the aforementioned related art, in order to make it possible to align each optical axis of the optical waveguide core 53 and the active layer 58A in the optical device side according to the alignment of the center axes of the optical waveguide side alignment markers 62 and the optical device side alignment markers 58a, it is required that the centers of each marker corresponding to the waveguide core 53 side (or the active layer 58A side in the optical device 58) are specified with high accuracy in advance.

Meanwhile, when the optical waveguide device is mass-produced, a number of optical waveguide chips are produced on a silicon wafer at the same time. The silicon wafer processing includes a lot of processes in which the whole wafer is stressed with a thermal process, a film formation, and the like. Therefore, when the substrate side alignment markers 62 provided in the optical device mounting area 57 and the optical waveguide core 53 provided in the optical waveguide section 55 are patterned respectively, the accuracy of position adjustment for both are different in some cases due to variations of distortion degree in the wafer. Further, the optical waveguide core 53 and the corresponding substrate side alignment markers 62 are formed in different layers, and their position adjustments are performed in different processes respectively. Therefore, their relative positions are depending on the accuracy of each position adjustment, and the positions thereof are not always stabilized. An example of this case is shown in FIG. 15.

In FIG. 15, the optical waveguide core 53 and the substrate side alignment markers 62 are provided on the same substrate 51. Further, both of the active layer 58A and the optical device side alignment markers 58a are provided in the optical device section 58 (refer to FIGS. 12 and 13). X marks in FIG. 15 express, in the optical device mounting area 57, proper positions in which the substrate side alignment markers 62 are supposed to exist (theoretically). On the other hand, actual positions of the substrate side alignment markers 62 are recognized by the monitoring camera and the like, which are shifted in some cases from the points expressed by X marks.

This is because the accuracy in the position adjustment varies due to the distortion of the wafer caused by the stress when each section in a module is patterned. Therefore, when the optical device 58 is mounted after the centers of the substrate side alignment markers 62 are aligned with the centers of the optical device side alignment markers 58a according to the method in the case of FIG. 14, a problem can occur where the optical axes of the waveguide core 53 and the active layer 58A are not aligned with each other as shown in FIG. 15. However, in the aforementioned example, there is no way to detect proper positions in which the substrate side alignment markers are supposed to exist. Therefore, it is impossible to know how much the misalignment amount is, and, in addition, it is impossible even to judge whether there is the misalignment or not. Accordingly, an output rate of non-defective products is declined because of the trouble accompanied by the optical device mounting.

The technique disclosed in Patent Document 1 is suitable for the position adjustment only in a direction along with the end faces where the optical waveguide section and the optical device section are matched. However, various transformations practically occurs in the substrate, the device section, and the like, which are caused by distortion due to a problem of processing accuracy or stress. Accordingly, the two-dimensional position adjustment including angular adjustment is required when the optical device section is to be mounted. It is very difficult for a one-dimensional linear alignment marker to perform this adjustment. For example, a big problem occurs if an optical axis of an optical waveguide is misaligned even by 1-2 degrees, however, such a small misalignment cannot be recognized practically with an alignment marker having a length far shorter than the optical waveguide. Further, the length of the alignment marker cannot be extended because an image needs to be within a screen of a monitor for the alignment. Therefore, this technique is not efficient in any alignment other than the one-dimensional alignment.

SUMMARY OF THE INVENTION

An exemplary object of the present invention is to provide an optical waveguide device, and a manufacturing method therefor which suppress effectively a harmful influence such as variations of patterning accuracy for an alignment marker due to distortion caused by stress on a substrate including an optical waveguide, with which mounting accuracy and productivity can be improved.

In order to achieve the exemplary object, the optical waveguide device according to an exemplary aspect of the present invention is one in which an optical device is aligned by an alignment marker so as to be mounted by hybrid mounting on a substrate on which an optical waveguide core is formed, wherein a fiducial marker for adjusting a mounting position of the optical device is provided at an absolute position on a basis of the optical waveguide core so that the optical waveguide core and the optical device are optically coupled.

The manufacturing method for an optical waveguide device according to anther exemplary aspect of the present invention is a method with which an optical device is aligned by an alignment marker so as to be mounted by hybrid mounting on a substrate on which an optical waveguide core is formed, wherein a fiducial marker for adjusting a mounting position of the optical device is formed at an absolute position on a basis of the optical waveguide core so that the optical waveguide core and the optical device is optically coupled.

As an exemplary advantage according to the invention, a regular mounting position of the optical device can be specified constantly depending on especially the fiducial marker provided in the optical waveguide side on the substrate. Therefore, if distortion occurs in an optical device mounting area, an amount of misalignment can be corrected with respect to the mounting position of the optical device. Accordingly, the optical device can be surely arranged at the regular position when the optical device is mounted, and it is possible to provide an excellent and unprecedented optical waveguide device and the manufacturing method for an optical waveguide device with which mounting accuracy and productivity can improve.

DESCRIPTION OF EXEMPLARY EMBODIMENTS

Figure 1:
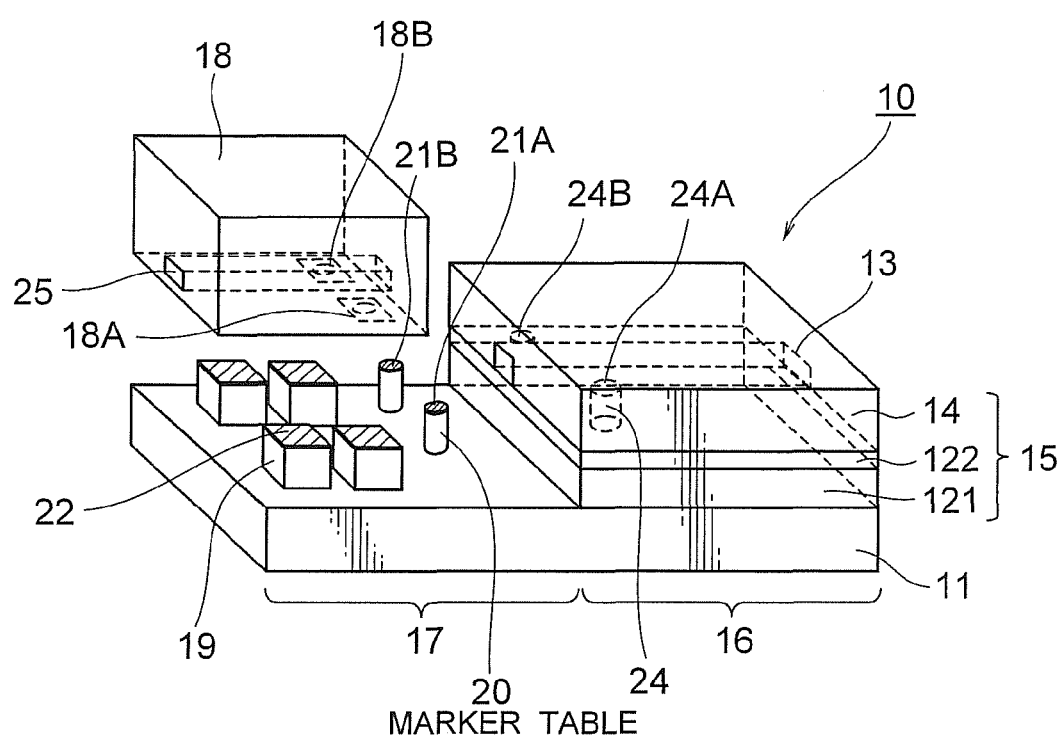
FIG. 1 is an exploded perspective view showing one exemplary embodiment of an optical waveguide device according to the invention.
Figure 2A:
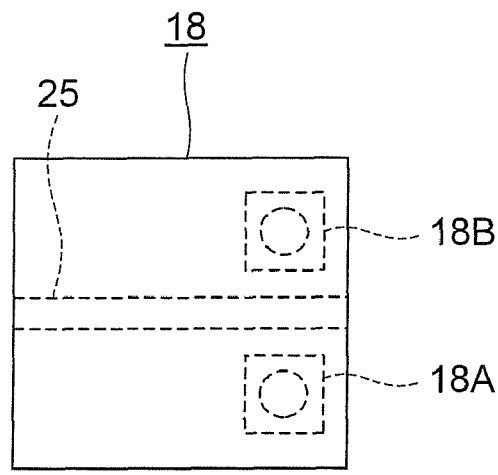
FIG. 2A is a plan view showing an optical device, which is a mounting target, in the optical waveguide device in FIG. 1.
Figure 2B:
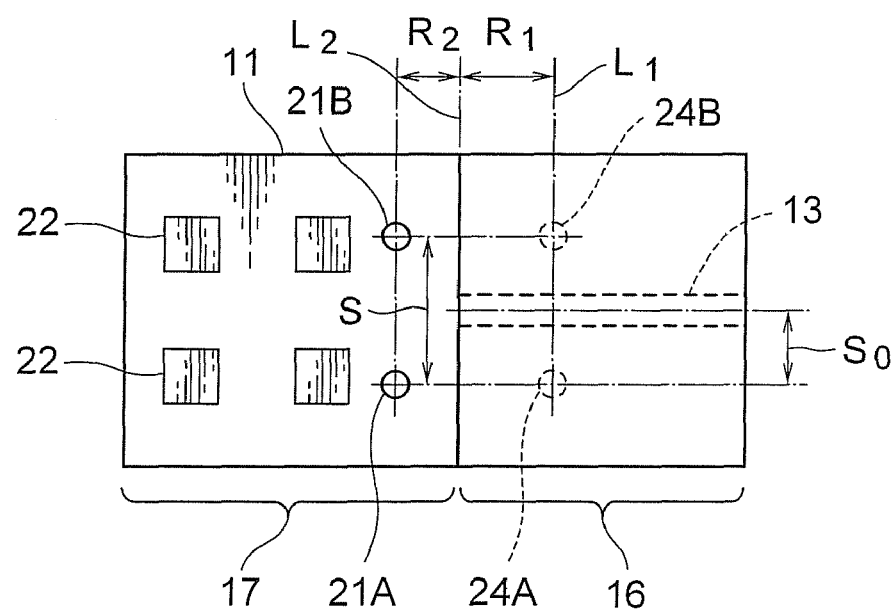
FIG. 2B is a plan view showing a substrate part including a waveguide core in a main body side of the optical waveguide device in FIG. 1.

Hereinafter, one exemplary embodiment of the invention will be explained with reference to the accompanying drawings. FIG. 1 shows a conceptually exploded perspective view of the optical waveguide device according to the exemplary embodiment. FIGS. 2A and 2B show plan views of the same. In FIG. 1, an optical waveguide device 10 includes a substrate 11 made of a silicon crystal, an optical waveguide forming section 16 provided on a portion of the substrate 11, an optical device mounting section 17 (an optical device mounting area) provided on another portion of the substrate 11, corresponding to the optical waveguide forming section 16. The optical waveguide forming section 16 includes an optical waveguide section 15 formed with a base layer 121, a lower cladding layer 122, an optical waveguide core 13, and an upper cladding layer 14 laminated on the substrate 11, all of which is made of a CVD film.

With respect to forming the optical waveguide section 15 and the optical device mounting section 17, each layer is firstly formed to be a film and processed all over a surface of the substrate 11, and then platform blocks 19 and marker tables 20 are formed in an area of the optical device mounting section 17 by etching. The platform blocks 19 and the marker tables 20 are formed by the same film with the base layer 121, and previously patterned chromium layers 21A, 21B, and 22 on the film are used as a mask when they are etched. Accordingly, such a structure can be realized. On the other hand, the optical waveguide core 13 and the fiducial marker tables 24 are formed by the same film, and both are aligned and formed together by a same mask to be patterned. Then, the fiducial marker tables 24 are formed at absolute positions based on the waveguide core 13. A chromium film is formed on the top surface of the fiducial markers 24. Accordingly, fiducial markers 24A and 24B are composed of the fiducial marker tables 24 and the chromium films.

As described above, the fiducial markers 24A, 24B are formed at the absolute position based on the optical waveguide core 13. Therefore, it becomes an absolute fiducial point when the optical device 18 is aligned so that the optical waveguide core 13 and the optical device 18 are optically coupled.

The optical device 18 is mounted on the optical device mounting section 17 so as to be coupled optically with an end face of the optical waveguide core 13 which is exposed on a cross-section of the optical waveguide section 15. Accordingly, the optical waveguide device 10 is formed. In this exemplary embodiment, a semiconductor laser chip is used in the optical device 18. Hereinafter, the whole optical device including the semiconductor laser chip is described as an LD.

Namely, in the exemplary embodiment of FIG. 1, the optical waveguide device 10 includes the optical waveguide section 15 including the optical waveguide core 13 formed on the substrate 11, and the optical device 18 (the LD) in an end face light emitting type fixed on the substrate 11 so as to correspond to the optical waveguide section 15. The optical waveguide section and the optical device are mounted by hybrid mounting on the substrate 11 so that both light end faces are coupled with each other. Thus, the optical waveguide device 10 is formed.

The LD side alignment markers 18A and 18B are provided on the bottom surface of the optical device 18, at the both sides of an LD active layer 25. Further, substrate side alignment markers 21A and 21B are provided on the substrate 11 on which the optical device 18 is to be mounted. The substrate side alignment markers 21A and 21B are arranged in positions where centers thereof are matched with centers of the LD side alignment markers 18A and 18B which are on the optical device 18 side, when the optical device 18 is mounted.

Figure 15:
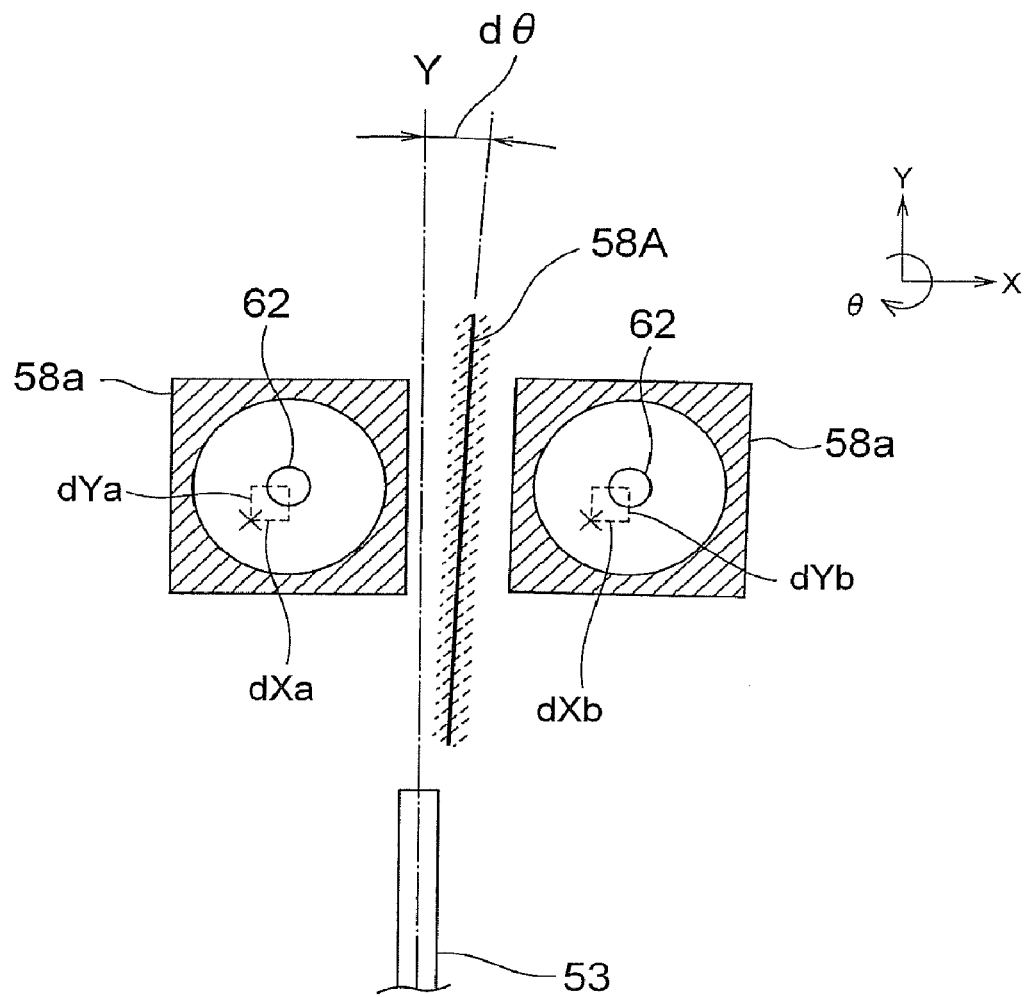
FIG. 15 is an explanatory diagram showing a misalignment condition of the optical device in FIG. 14.

As described in the aforementioned example, in the manufacturing processing of the optical waveguide device 10, the alignment accuracy is sometimes varied when the substrate side alignment markers 21A and 21B is patterned because a silicon wafer which is a material of the substrate 11 is sometimes distorted due to the thermal process or the like. In such a case, even if the LD side alignment markers 18A and 18B of the optical device 18 are placed to be corresponded to the substrate side alignment markers when the optical device 18 is mounted, the positions of the LD active layer 25 in the optical device 18 side and the waveguide core 13 in the optical waveguide section 15 side are not matched completely with each other (refer to FIG. 15) in some cases.

With the above situation, in this exemplary embodiment, two markers which can be used as absolute fiducial are provided so as to determine a misalignment direction and a misalignment amount between proper positions and actual positions of the substrate side alignment markers. These fiducial markers 24A and 24B are formed near the optical waveguide core 13 at the same time when the optical waveguide core 13 is patterned on the substrate 11, as described. Accordingly, relative positions of the optical waveguide core 13 and the fiducial markers 24A and 24B are kept to be constantly stable, and, unlike a case with the substrate side alignment markers 21A and 21B, misalignment with respect to the optical waveguide core 13 is not occurred during the manufacturing process.

Because such fiducial markers 24A and 24B are provided, the proper positions (the regular positions) for the substrate side alignment markers 21A and 21B with respect to the fiducial markers 24A and 24B can be recognized. If the optical device mounting position is determined taking a difference between the regular positions and the actual positions of the alignment markers as a correction value, the optical waveguide core 13 in the optical waveguide section 15 and the active layer 25 in the optical device 18 side can be matched with each other aligning those center axes immediately and with high accuracy, which will be described later.

The aforementioned fiducial markers and other markers will be explained. The number of the fiducial marker to be provided may be one, but there are two of those fiducial markers (24A, 24B) provided in the forming area of the optical waveguide section 15 in this exemplary embodiment. That is, the fiducial markers 24A and 24B are provided in both sides of the optical waveguide core 13 in the optical waveguide section 15 on the substrate 11, as shown in FIGS. 1 and 2. Each fiducial marker 24A and 24B are constructed comparably solidly by the chromium film. Further, an area formed by connecting those two of the fiducial markers 24A, 24B and aforementioned two of the substrate side alignment markers 21A and 21B is designed in a rectangle having each internal angle of 90 degrees in the exemplary embodiment, which leads to an immediate calculation of the misalignment amount and an immediate mounting operation, described later. In this regard, the area surrounded by the segments connecting each of the fiducial markers 24A, 24B and the substrate side alignment marker 21A, 21B is not limited in the shape mentioned above in the exemplary embodiment of the invention. The shape may be another specified square shape having internal angle of degrees other than 90 degrees. Further, in this exemplary embodiment, two of the fiducial markers are provided at the absolute positions based on the optical waveguide core, but the number of the fiducial markers is not limited by the above. The number may be selected accordingly as long as one or more of the fiducial markers is provided.

These fiducial markers 24A, 24B, and the above mentioned optical waveguide core 13 are formed together from a film in the same layer by photolithography using the same mask, so that a positional relationship between them does not vary depending on a problem such as a matching accuracy.

The substrate side alignment markers 21A, 21B, and the fiducial markers 24A, 24B are formed as light shielding films each of which are in almost same shapes with upper surfaces of the marker tables 20 and the fiducial marker tables 24. These light shielding films are used for marker recognition with transmitted infrared light. However, even if the light shielding films are not included, the marker can be recognized by using diffraction at a lateral part of the marker table, incident light, or the like. Further, corresponding to two of the substrate side alignment markers 21A, 21B, two of the LD side alignment markers 18A and 18B in an opening type provided in a bottom surface side of the optical device 18 are formed with a light shielding film in a square shape inside of which is opened in a circular shape. This light shielding film is formed by a gold film.

Figure 3A:
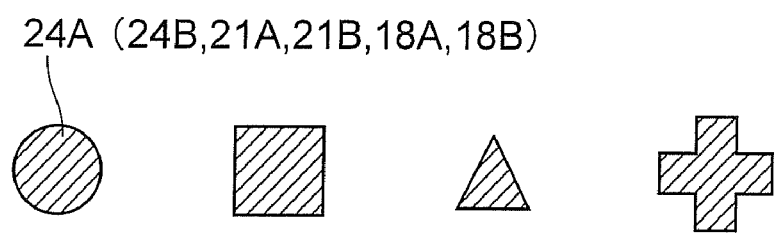
FIG. 3 is an explanatory diagram showing each specific example of fiducial marker shapes disclosed in FIG. 1.
Figure 3B:
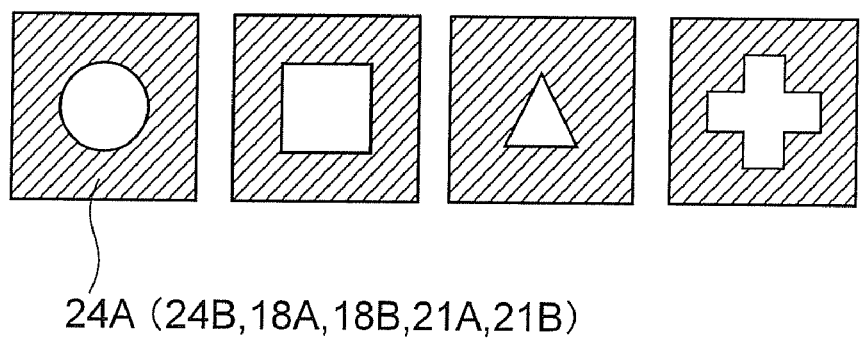

In this case, the above mentioned opening type LD side alignment markers 18A and 18B may be replaced by a light reflective film having a simple geometric patterned inner side opening, with which a center position can be specified easily, with a polygonal shaped outer side, instead of the reflective film having the circular shaped inner side opening with a square shaped outer side. FIG. 3 shows various examples of the fiducial markers 24A, 24B and the alignment markers 21A, 21B, 18A, 18B. FIG. 3A shows shapes of reflective surfaces, inside of the shapes are reflective surfaces. FIG. 3B shows various examples of punched shapes which have square shaped outer sides and geometric shaped inner sides.

In the example of FIG. 3, it is not limited which markers are to be used as the fiducial markers 24A, 24B and which markers are to be used as the alignment markers 21A, 21B, 18A, 18B. Anything can be selected freely to be used therefor. Although markers are not limited in those shapes particularly, the one disclosed in FIGS. 1 and 2 is selected to be used in the above exemplary embodiment.

Next, a manufacturing method will be explained hereinafter with reference to FIG. 4, in which the fiducial markers 24A, 24B and the substrate side alignment markers 21A, 21B are arranged at the positions disclosed in FIG. 1 on the substrate 11.

Figure 4A:
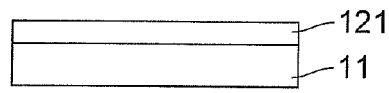
FIG. 4 is an explanatory diagram showing procedures 4A to 4L for mounting the fiducial marker disclosed in FIG. 1 on the substrate.
Figure 4B:
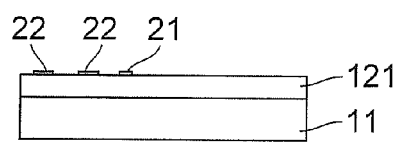
Figure 4C:
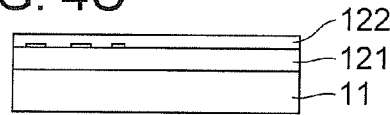
Figure 4D:
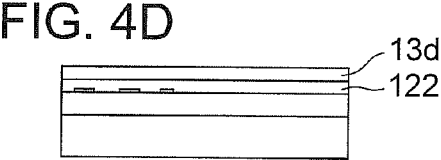

Firstly, a silicon oxide film, which is to be a first layer of a base layer 121, is formed on the silicon substrate 11 (FIG. 4A), and then chromium films 21 and 22 are patterned at each predetermined position in a predetermined shape on the base layer 121 so as to be used as the masks when the platform blocks 19 and the marker tables 20 of the substrate side alignment markers are formed later (FIG. 4B). Next, a silicone oxide film which is to be a second layer of the lower cladding layer 122 is formed (FIG. 4C). A silicone oxide film 13d having high refraction index, which is to be the optical waveguide core 13, is laminated thereon (FIG. 4D).

Figure 4E:
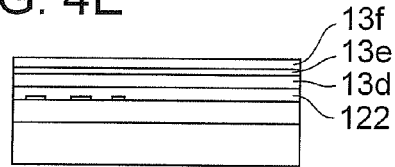
Figure 4F:
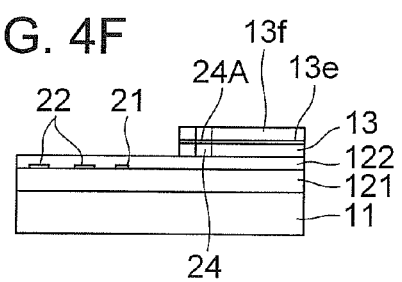
Figure 4G:
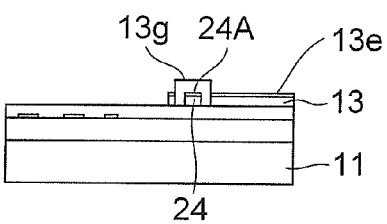

A chromium film 13e is further formed on the silicon oxide film 13d and resist 13f is applied thereon (FIG. 4E). The optical waveguide core 13 and the fiducial markers 24A, 24B are patterned together by the photolithography, and the silicon oxide film 13d and the chromium film 13e are etched by reactive ion etching, and then the optical waveguide core 13 and the fiducial marker tables 24 are formed (FIG. 4F). The chromium films on upper surfaces of the fiducial marker tables 24 in this case are to be the fiducial markers 24A and 24B.

Figure 4H:
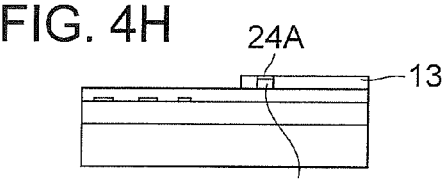
Figure 4I:
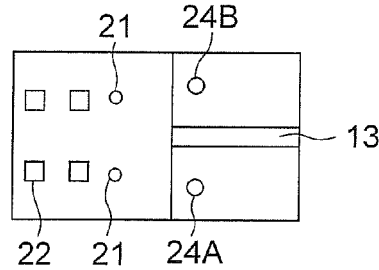
Figure 4J:
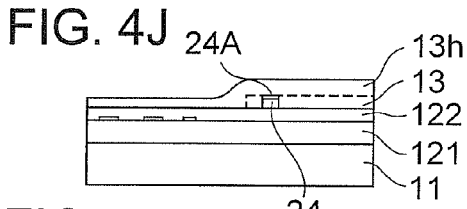

Next, the resist 13f is removed once, and resist 13g is patterned again so as to protect only the fiducial markers 24A and 24B (FIG. 4G), and the chromium film 13e remaining on the upper surface of the optical waveguide core 13 is removed by chromium etchant. Then, the resist 13f is removed (FIG. 4H). A structure formed according to those processes viewed from above is shown in FIG. 4I.

Figure 4K:
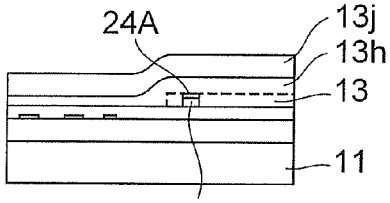
Figure 4L:
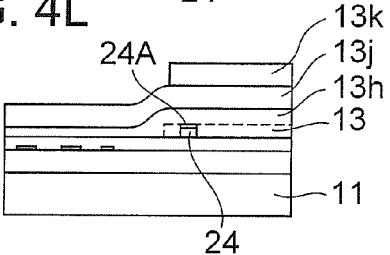
Figure 4M:
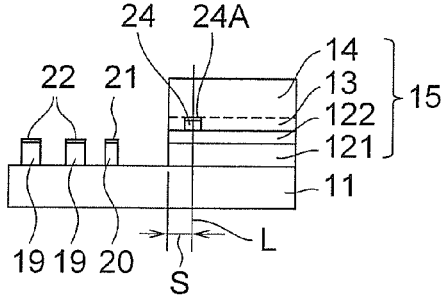

Next, a low melting point silicon oxide film 13h is laminated to put the optical waveguide core 13 thereinto, and is reflowed at high temperature (FIG. 4J), and then a silicon oxide film 13j is formed thereon so as to complete the upper cladding layer (FIG. 4K). Subsequently, resist patterning is performed for forming the optical waveguide section 15 taking resist 13k as a mask (FIG. 4I), and the end face of the optical waveguide core 13 is exposed by dry etching. Further, the chromium films 21 and 22 patterned in FIG. 4B (these chromium films are finally to be the substrate side alignment markers) function as a mask for the dry etching of the silicon oxide film so that the platforms 19 and the marker tables 20 are formed, and the processes are complete.

In this case, heights of the optical waveguide core 13 and the platforms 19 depend on only uniformity of film pressure applied to form the base layer 121 during the film formation. Generally, pressure on a surface of a wafer varies by about 1%. Accordingly, when a film thickness of the base layer 121 is assumed to be 1.5 µm, the optical waveguide core 13 and the platforms 19 may be different from each other in height only by 15 nm. Therefore, the adjustment in a height direction can be performed sufficiently by only mounting the optical device on the platforms 19. Further, the fiducial markers 24A and 24B are formed by the chromium film, so that the image can be recognized with the infrared light.

Next, an optical device mounting system 30 and an operation thereof will be explained with reference to FIGS. 5 to 11 in a case where the optical device 18 section is mounted on the aforementioned optical device mounting section 17 on the substrate 11 in the above described optical waveguide device 10.

As for the optical device mounting system, when the optical device 18 is mounted, actual positions of the substrate side alignment markers 21A and 21B are detected based on the fiducial markers 24A and 24B provided in the side of the optical waveguide forming section 16 on the substrate 11 in the optical waveguide device 10 side. Then, a misalignment amount between the actual positions and predetermined regular positions of the substrate side alignment markers 21A, 21B are measured, the LD side alignment markers 18A, 18B is transferred by the amount for correcting the misalignment, and the mounting position for the optical device 18 is adjusted.

Figure 5:
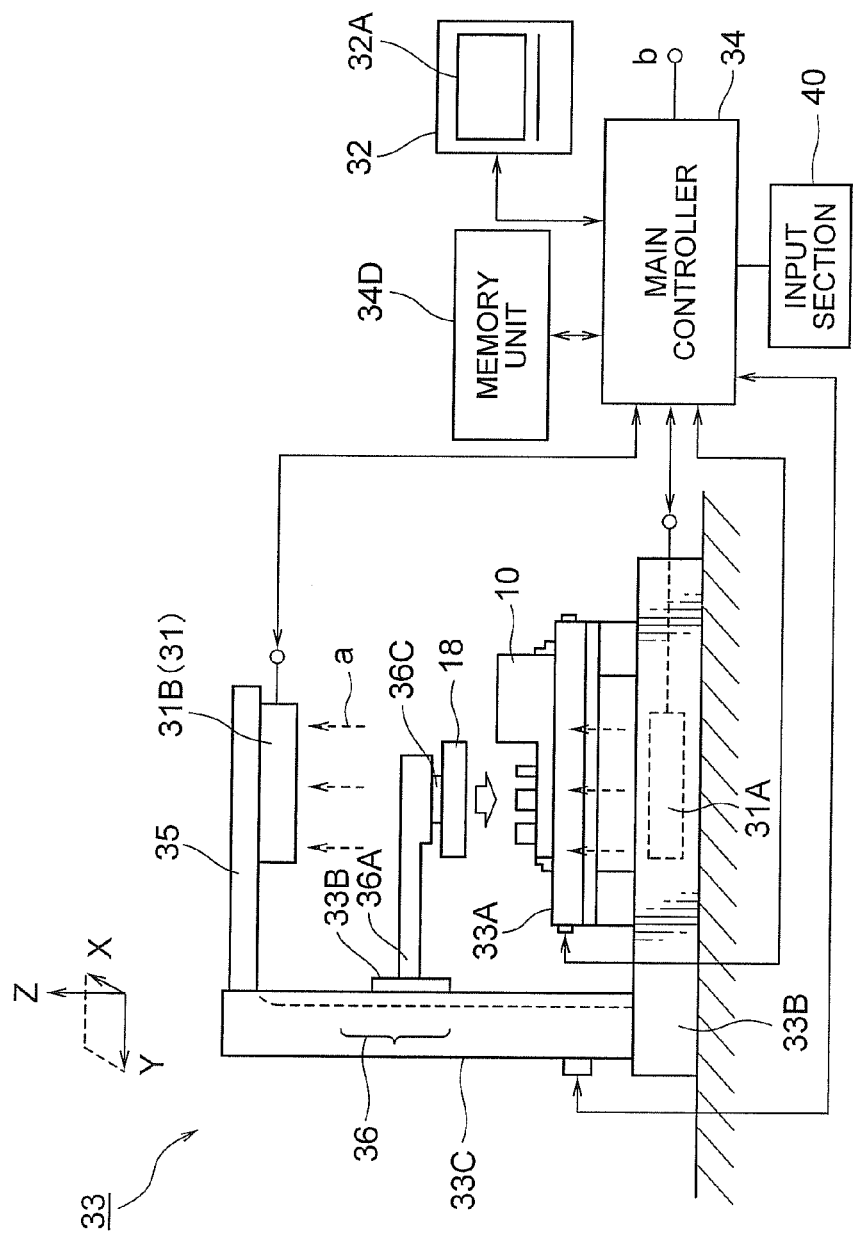
FIG. 5 is a general configuration diagram showing an overall optical device mounting system in a case where the optical device disclosed in FIG. 1 is mounted.

Firstly, the optical device mounting system 30 shown in FIG. 5 is used when the optical device 18 (LD) in the end face light emitting type is mounted on the substrate 11 so as to match with the optical waveguide core 13 of the optical waveguide section 15 formed in the optical waveguide forming section 16 on the substrate 11.

This optical device mounting system 30 includes an imaging unit 31 for taking an image of a mounting area for the optical device 18 (the optical device mounting section 17) on the substrate 11 with transmitted infrared light, an image display unit 32 for displaying the mounting area on a monitor by recognizing a transmitted image obtained by the imaging device 31 as image information, an LD transferring and placing mechanism 33 for holding and transferring the optical device 18 to an arbitrary position on an X-Y plane and placing it thereon, and a main controller 34 for drive-controlling each operation of the LD transferring and placing mechanism 33, the image display unit 32, and the imaging unit 31.

The LD transferring and placing mechanism 33 includes, as shown in FIG. 5, a transferring table mechanism section 33A capable of holding and transferring the optical waveguide device 10 in an arbitrary direction on the X-Y plane, a supporting base 33B for placing and holding the optical waveguide device 10 horizontally through the transferring table mechanism 33A, and a supporting column section 33C constructed on a left end part of the supporting base 33B in FIG. 5.

The supporting column section 33C of those above mentioned has a cantilever beam 35 provided at a top end part of the supporting column section 33C in a protruding condition along by the supporting base 33B, and a vertical direction transferring unit 36 held by the supporting column 33C itself in a vertically moveable state in between the cantilever beam 35 and the transferring table mechanism section 33A.

This vertical direction transferring unit 36 has a holding arm 36A provided in the protruding condition from the supporting column 33C side to a space between the cantilever beam 35 and the transferring table mechanism member 33A for holding a transferring member (the optical device 18) downward at an end part thereof, a vertical direction transferring and stopping mechanism 36B for holding a back end part of the holding arm 36A while it is included in the supporting column section 33C, and a rotary drive mechanism 36C for holding the optical device 18 downward at an end part of the holding arm 36A and for rotating the optical device finely in a horizontal plane or stopping the rotation. Thus, the optical device 18 is held by the rotary drive mechanism 36C downward, and capable of rotating finely or stopping in accordance with an instruction of the main controller 34, which will be described later.

Figure 6:
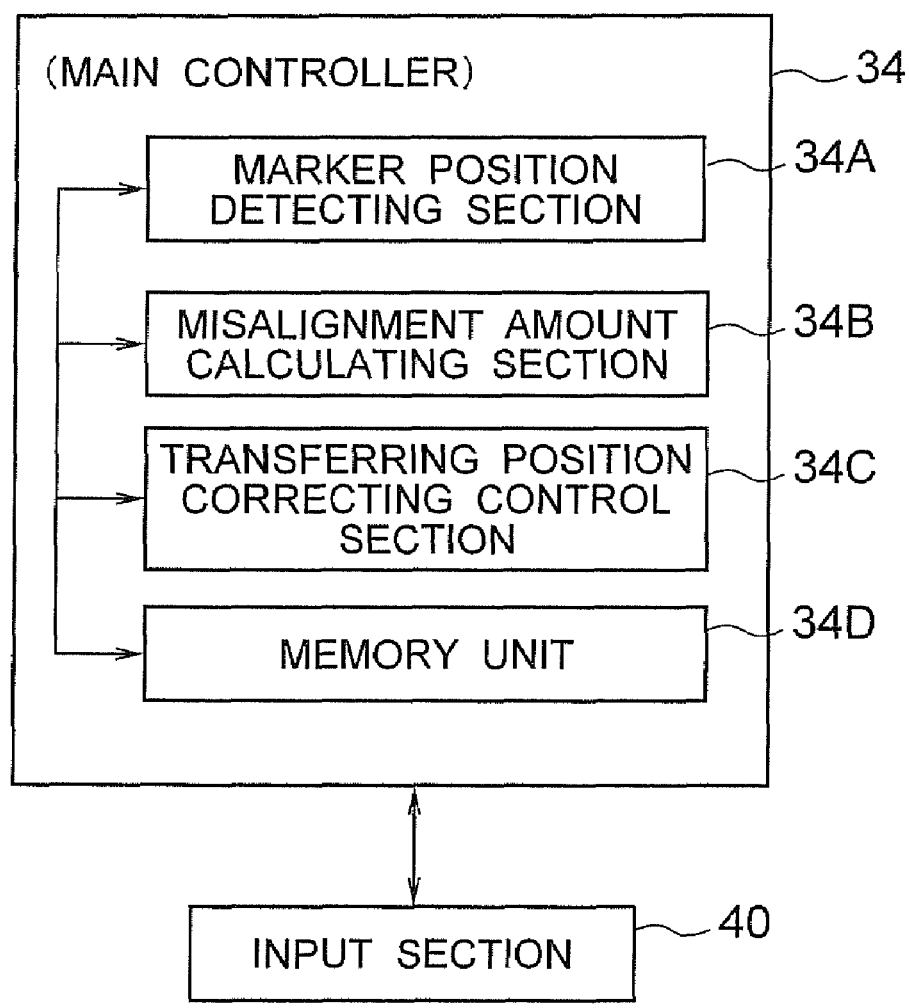
FIG. 6 is a block diagram showing one example of a main controller disclosed in FIG. 5.

A frame of the LD transferring and placing mechanism 33 is generally formed in an L-shape, as shown in FIG. 6, and includes an infrared light source 31A, which is a portion of the imaging unit 31, inside of the supporting base 33B which is arranged at the bottom end part.

Further, the cantilever beam 35 includes a CCD camera 31B, which is disposed to face the infrared light source 31A so as to receive an infrared radiation (an arrow a) emitted from the infrared light source 31A, at the end part of the cantilever beam. The CCD camera 31B and the infrared light source 31A compose the aforementioned imaging unit 31.

The main controller 34 includes a marker position detecting function for detecting actual positions of the substrate side alignment markers 21A and 21B according to the image information when the optical device 18 is mounted on the optical waveguide device shown in FIG. 1, a misalignment calculating function for calculating difference between the predetermined regular positions of the substrate side alignment markers 21A and 21B and the actual positions of the substrate side alignment markers 21A and 21B detected by the marker detecting function, based on the fiducial markers 24A and 24B provided in advance in the optical waveguide section side, so as to calculate the misalignment "dX, dY" as a correction amount, and a transferring position correcting control function for driving the LD transferring and placing mechanism 33 based on the calculated correction amount so as to correct the alignment of both using the LD side alignment markers and the substrate side alignment markers.

The main controller 34 includes specifically a marker position detecting section 34A for detecting information on an actual position of the substrate side alignment markers 21A and 21B according to the image information, and a misalignment amount calculating section 34B for comparing the information on detected actual position of the substrate side alignment markers 21A and 21B with the information on the predetermined regular position of the substrate side alignment markers 21A and 21B so as to calculate the difference (dX, dY) as the misalignment amount.

The main controller 34 is to drive the LD transferring and placing mechanism 33 which transfers and controls placing the optical device 18 while adjusting a positional relationship between the substrate side alignment markers 21A, 21B and the PD side alignment markers 18A, 18B previously attached on the optical device 18. Accordingly, the main controller 34 further includes a transferring position correcting controller 34C for transferring and controlling to place the optical device 18 based on the misalignment amount calculated by the misalignment amount calculating section 34B.

Reference numeral 34D shows a memory unit storing necessary calculation, and necessary information and program for controlling operations. Contents of the memory unit 34D can be added, deleted, or corrected in accordance with an instruction from an input section 40 disclosed in FIG. 5.

Further, the marker position detecting section 34A, the misalignment amount calculating section 34B, or the transferring position correcting controller 34C performs the marker position detecting function, the misalignment calculating function, or the transferring position correcting control function respectively.

Next, an operation of the mounting system in the above mentioned exemplary embodiment will be explained with reference to FIGS. 7 to 11. In this case, the entire operation is controlled by the control program (unillustrated) configured in the main controller 34 previously in the above mentioned mounting system. Further, this control program is configured to be variable according to an outside instruction from the input section 40, if required.

Figure 7:
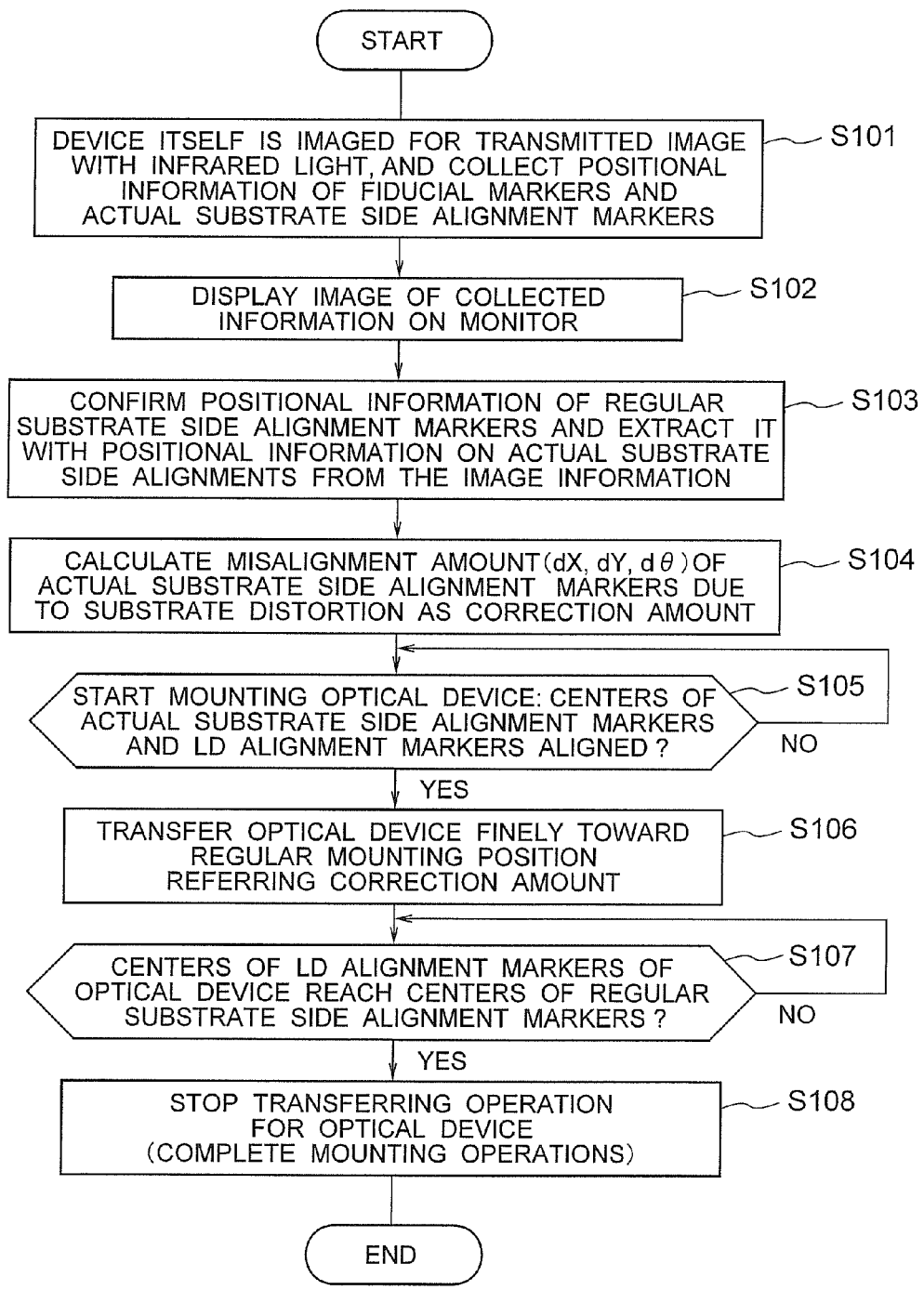
FIG. 7 is a flowchart showing operations of the optical device mounting system disclosed in FIG. 5.

FIG. 7 is a flowchart showing a procedure for mounting the optical device on the predetermined position on the substrate 11. Firstly, to operate the mounting system, the mounting system including the LD transferring and placing mechanism 33 is powered (an electric source is not illustrated) to set the whole mounting system in an active condition. Sequentially, the optical waveguide device 10 before mounting the optical device as shown in FIG. 1 (the substrate 11 including the portion of waveguide core 13) is mounted on the transferring table mechanism section 33A, and fixed.

Next, the imaging unit 31 operates in accordance with an instruction by the main controller 34 to image two of the fiducial markers in the optical device mounting area 17 on the substrate 11. That is, before the optical device 18 (LD) in the end face light emitting type is mounted on the substrate 11, the positions of the fiducial markers 24A and 24B are recognized by the imaging unit 31 utilizing the transmitted light (the infrared radiation), and the position information (coordinates) of the fiducial markers 24A and 24B is set as reference coordinates (Step S101: a fiducial marker position recognizing and setting step).

Next, the imaging unit 31 images the substrate side alignment markers 21A and 21B in the mounting area (the optical device mounting section 17). The imaged information (the collected information) is sent from the CCD sensor 31B of the imaging unit 31 to the main controller 34 so as to be recognized as image information, and an image of the substrate side alignment markers 21A and 21B is displayed on the monitor 32A in the image displaying unit 32 (Step S102: a image displaying step).

The main controller 34 includes the function of calculating the misalignment amount of actual positions of the substrate side alignment markers 21a and 21b in accordance with the position of the fiducial markers 24A and 24B (the reference coordinates). Hereinafter, the above mentioned will be explained with reference to FIG. 8.

Figure 8:
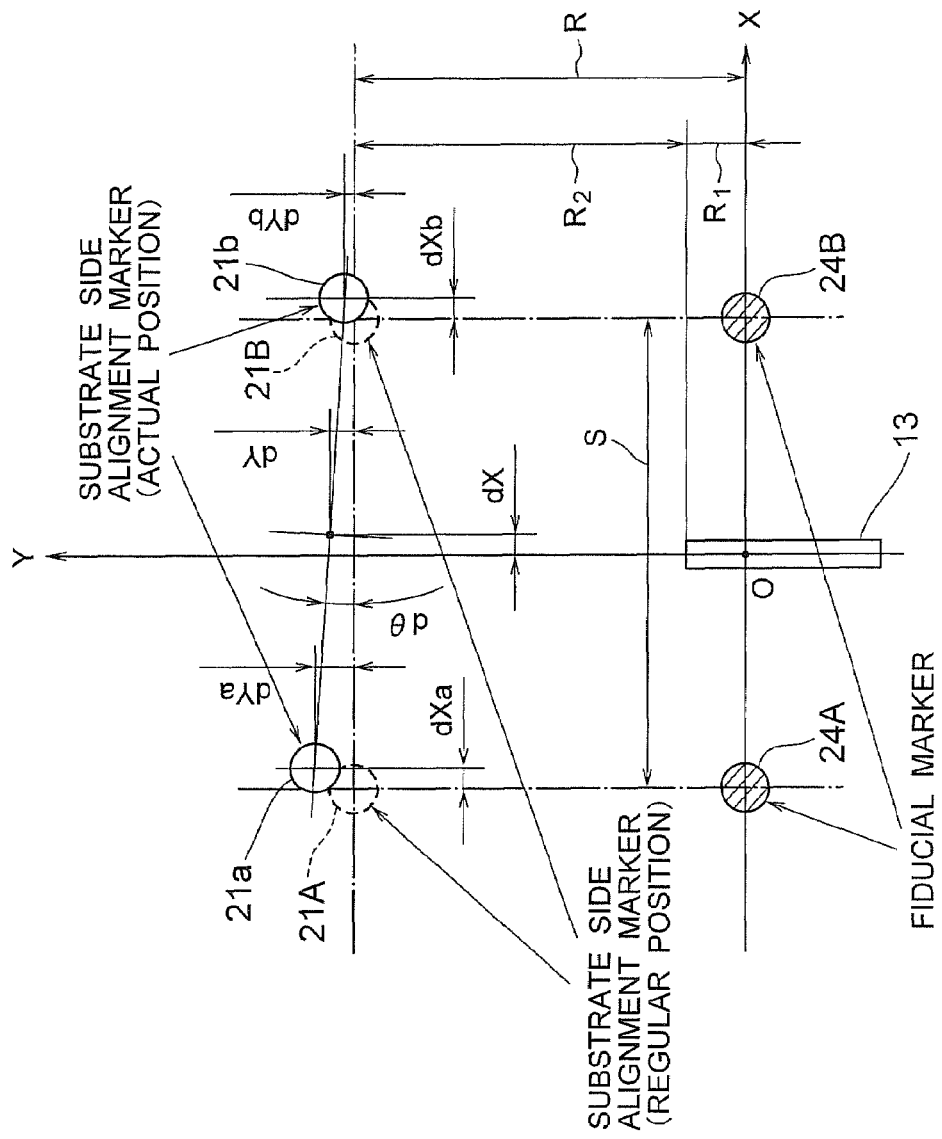
FIG. 8 is an explanatory diagram showing a positional relationship between the fiducial markers and the substrate side alignment markers provided on the substrate in FIG. 1, and a misalignment state of the substrate side alignment markers in conjunction with distortion of the substrate.

Firstly, the regular position of the substrate side alignment markers 21A and 21B and the actual position of the substrate side alignment markers 21a and 21b obtained from the image information by image recognition, with respect to the predetermined positions of fiducial markers 24A and 24B (the reference coordinates), are extracted, and the positional information is displayed on an X-Y surface previously set in the monitor screen. FIG. 8 shows the screen in a case where each substrate side alignment markers 21a and 21b is misaligned with respect to the regular substrate alignment markers 21A and 21B.

In FIG. 8, "S" expresses a distance between the substrate side alignment markers 21A and 21B in the regular positions, and "S0" expresses S/2. That is, two of the substrate side alignment markers 21A and 21B are disposed in a same distance "S" from the optical axis of the optical waveguide core 13. Further, "R" expresses a distance between the fiducial markers 24 and the regular substrate side alignment markers 21.

In this case, a coordinate system is set where a line passing through a center point of a segment connecting two of the substrate side alignment markers 21A and 21B and corresponding to the optical axis of the optical waveguide core 13 is to be a Y axis, and a line orthogonal to the Y axis and connecting 24A and 24B is to be an X axis (on the waveguide core 13). The above setting is performed by the main controller 34. When a segment connecting the regular substrate side alignment markers 21A and 21B is to be L2, a segment L3 expresses a case where a misalignment occurs in a condition where L3 is away from L2 outward from the center, with rotating clockwise by dθ degrees.

In the coordinate system shown in FIG. 8, an misalignment amount (a correction amount) between the actual substrate side alignment markers 21a and 21b obtained from the screen information and the corresponding regular substrate side alignment markers 21A and 21B is specified as follows on the set X-Y coordinate system by the main controller 34 (Step S104: a misalignment amount specifying step).

That is, as for the actual substrate side alignment marker 21a and 21b, when a misalignment amount between the substrate side alignment marker 21a and the corresponding regular substrate side alignment marker 21 is α, and a misalignment amount between the substrate side alignment marker 21b and the corresponding regular substrate side alignment marker 21 is β, these are specified as;

$$\alpha=(dXa,dYa), \beta=(dXb,dYb).$$

Next, each misalignment amount dX, dY, dθ (an angle of the misalignment) of the actual substrate side alignment marker 21a and 21b with respect to the two fiducial markers 24A and 24B is calculated by the following equations.

$$dX=(dXa+dXb)/2$$

$$dY=(dYa+dYb)/2$$

$$d\theta=\arctan\left[(dYb-dYa)/(dXb-dXa)\right]$$

In this exemplary embodiment, those dX, dY, and dθ are calculated in the main controller 34, and specified as the misalignment amount of the substrate 11 corresponding to the optical device 18. When performing the high accuracy mounting of this embodiment, in which the optical device 18 is mounted on the regular position and a center line of the active layer 25 in the optical device 18 is matched to a center line of the waveguide core 13, those dX, dY, and dθ are also efficiently used as mentioned below, as control amounts, when the main controller 34 operates the transferring table mechanism section 33A and the vertical direction transferring unit 36. The details will be described later.

Next, as mentioned above, after the misalignment amounts dX, dY, dθ of each actual substrate side alignment marker 21a and 21b are specified with respect to two of the fiducial markers 24A and 24B, the optical device 18 is held by the vertical direction transferring unit 36 according to an operator or a transferring engagement mechanism unillustrated in FIG. 5. In this case, the optical device 18 is held downward by the rotary drive mechanism 36C at the end of the holding arm 36A included in the vertical direction transferring unit 36.

Sequentially, the vertical direction transferring unit 36 operates in response to the instruction from the main controller 34 so as to transfer the optical device 18 held downward to the optical device mounting area 17 on the substrate 11 (refer to FIG. 1), at the same time, the vertical direction transferring unit arranges the optical device 18 on the optical device mounting area 17 while the LD side alignment marker 18A and 18B (which are in the same shape and the same size) provided at the bottom surface (the facing surface to the substrate) of the optical device 18 are placed so as to be matched with each center of the substrate side alignment markers 21a and 21b (Step S105: refer to FIG. 7).

Figure 9:
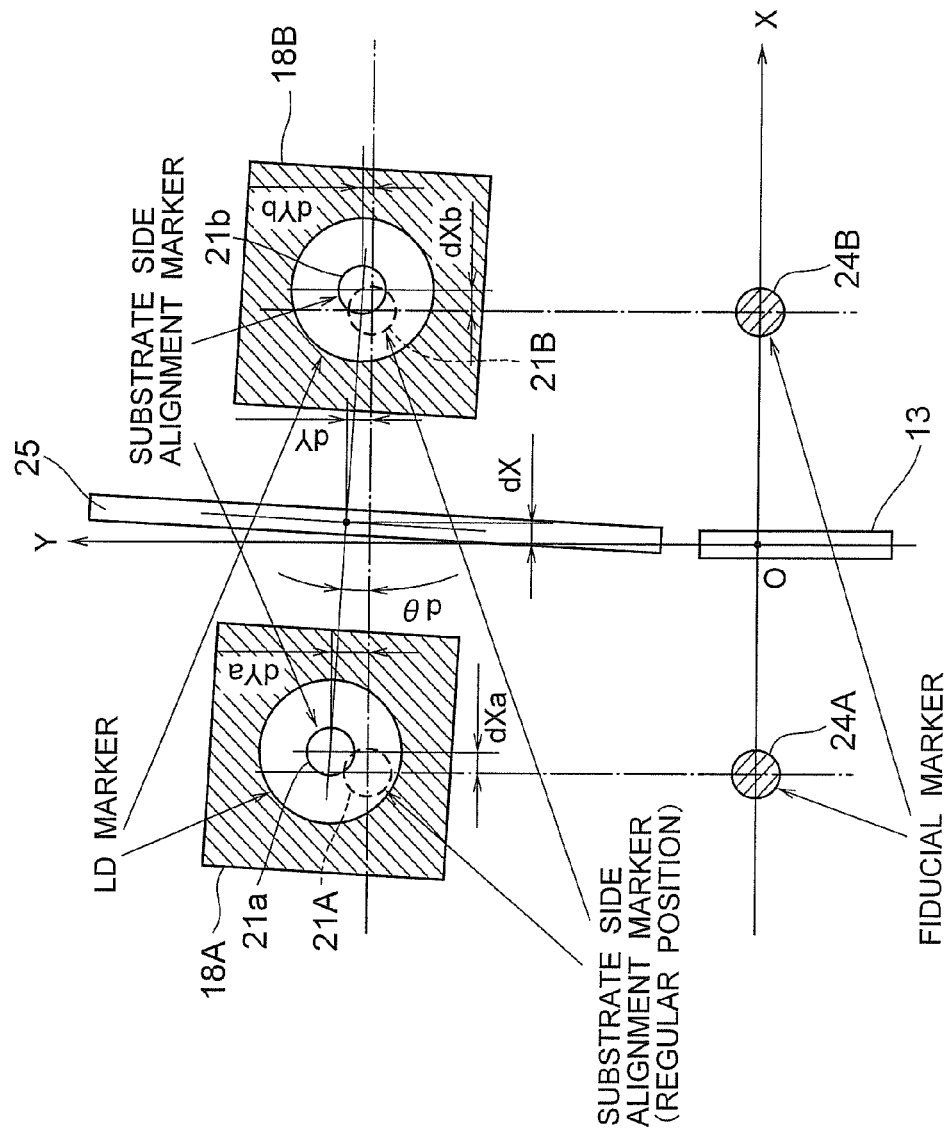
FIG. 9 is an explanatory diagram showing a case where, on the substrate with which the misalignment has occurred in FIG. 8, centers of the substrate side alignment markers are matched with centers of the LD alignment markers in the optical device side (the optical device is in a mounted condition)

The above mounting operations for the optical device is performed when the main controller 34 gives a control instruction according to the image information inputted by the imaging unit 31 and the vertical direction transferring unit 36 and the transferring table mechanism section 33A accordingly operates in response to the control instruction. Consequently, the optical device 18 is mounted on the optical device mounting area 17 on the substrate 11. FIG. 9 shows conditions of each marker at this point.

Meanwhile, the optical device 18 in FIG. 9 is mounted in a condition where the centers of the LD side alignment markers 18A and 18B in the side of the optical device 18 are aligned with the misaligned substrate side alignment markers 21a and 21b. Consequently, in FIG. 9, the mounted optical device 18 itself is arranged in a condition rotated by dθ (an angle of misalignment) in the figure with respect to the segment connecting the fiducial markers 24A and 24B (the X axis).

Figure 10:
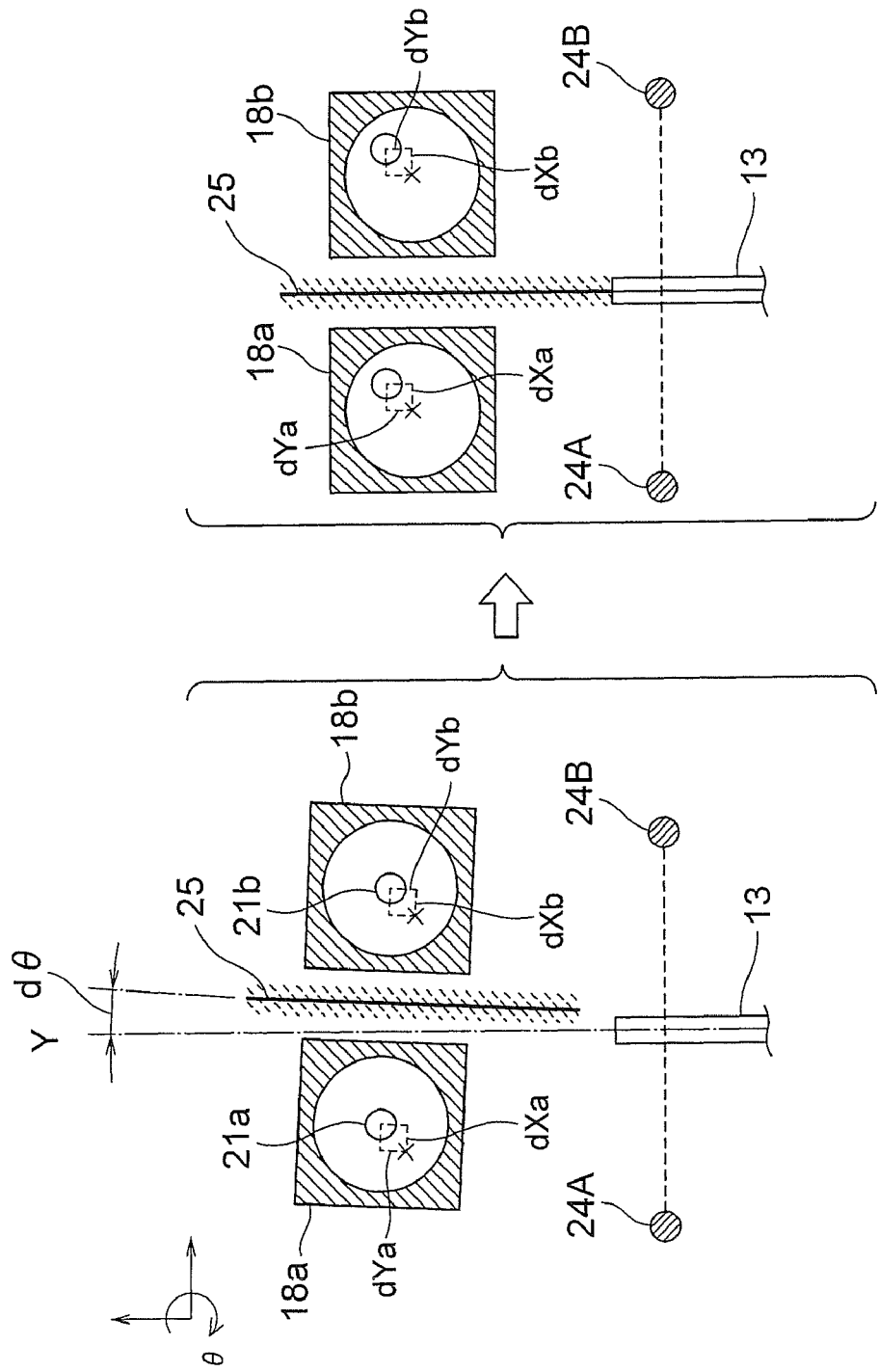
FIG. 10 is an explanatory diagram showing a positional relationship between each marker in a case where a mounting position for the optical device is finely adjusted from the mounted condition of the optical device shown in FIG. 9 so that a center axis of an LD active layer is aligned with a center axis of the waveguide core.

Therefore, in the next step, as indicated by an arrow in FIG. 10, the optical device 18 is transferred and the mounting position thereof is corrected (fine adjustment) by the positional misalignment amounts dX, dY, and dθ according to the vertical direction transferring unit 36, or the vertical direction transferring unit 36 and the transferring table mechanism section 33A, in addition, according to control of the main controller 34. Namely, the LD side alignment markers 18A and 18B of the optical device 18 are adjusted finely toward center positions of the corresponding regular substrate side alignment markers 21A and 21B (Step S106: refer to FIG. 7).

The main controller 34 performs the transferring control to transfer the optical device 18 in a direction for reducing the misalignment amounts dX, dY and dθ until the centers of the LD side alignment markers 18A and 18B match with the centers of the substrate side alignment markers 21A and 21B (Step S107). The main controller 34 monitors such operations according to the positional information obtained by the imaging unit 31.

That is, as shown in FIG. 10, the optical device 18 is controlled to be transferred so that the centers of the LD side alignment markers 18A and 18B placed at positions of the actual substrate side alignment markers 21a, 21b which are recognized in the marker extracting step are moved to the positions which are shifted by the positional misalignment amounts dX, dY, and dθ (i.e. the position of the regular substrate side alignment markers 21A and 21B), and the fine adjustment is performed until the centers of the markers 18A and 18b and the centers of the other markers are matched practically (transferring place correcting control step). In FIG. 10, X shows the proper positions for the substrate side alignment markers 21a and 21b (the regular positions).

Figure 11:
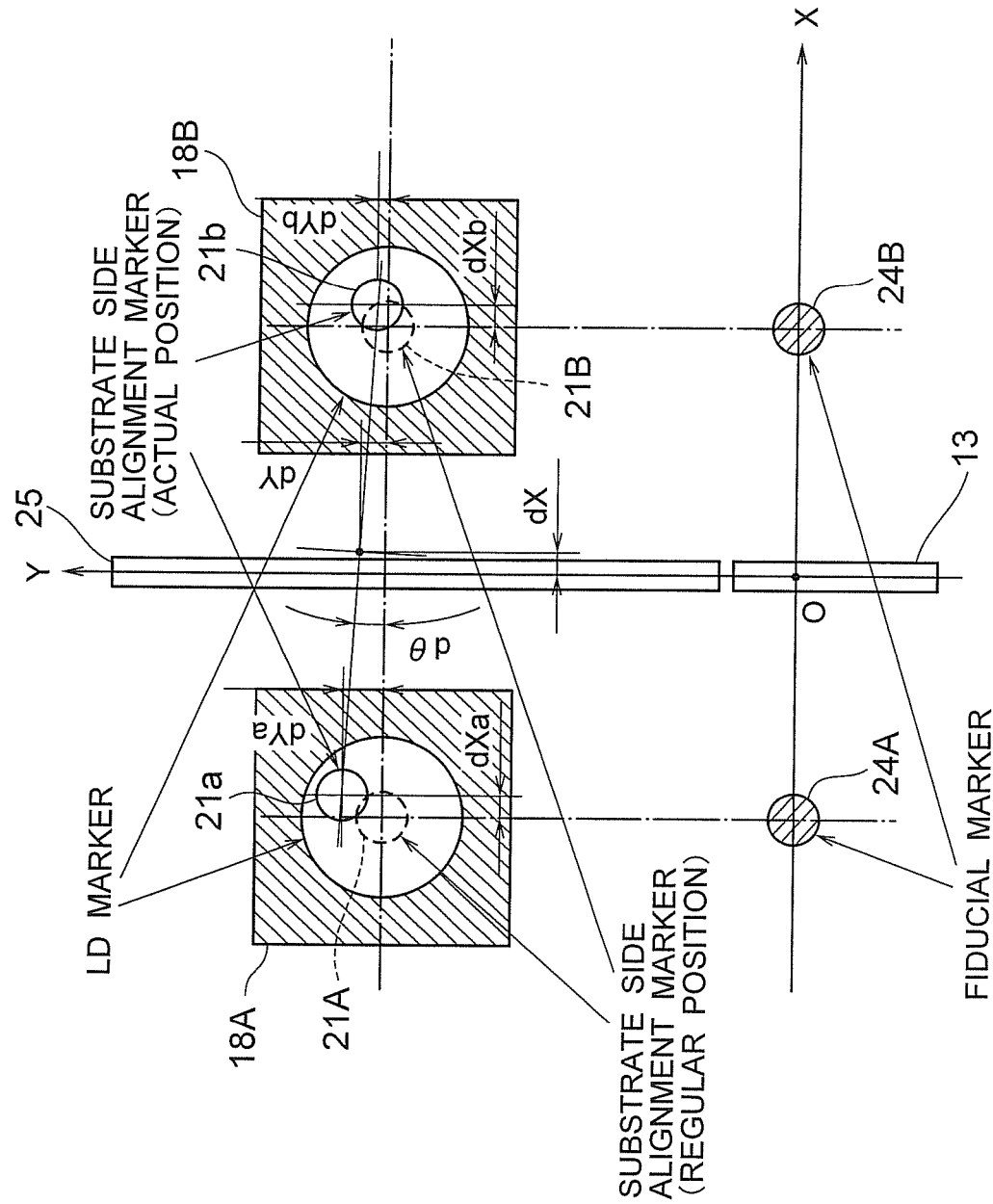
FIG. 11 is an explanatory diagram showing a case where the center axis of the LD active layer is aligned with the center axis of the waveguide core by performing the mounting operation in FIG. 10.
Figure 12:
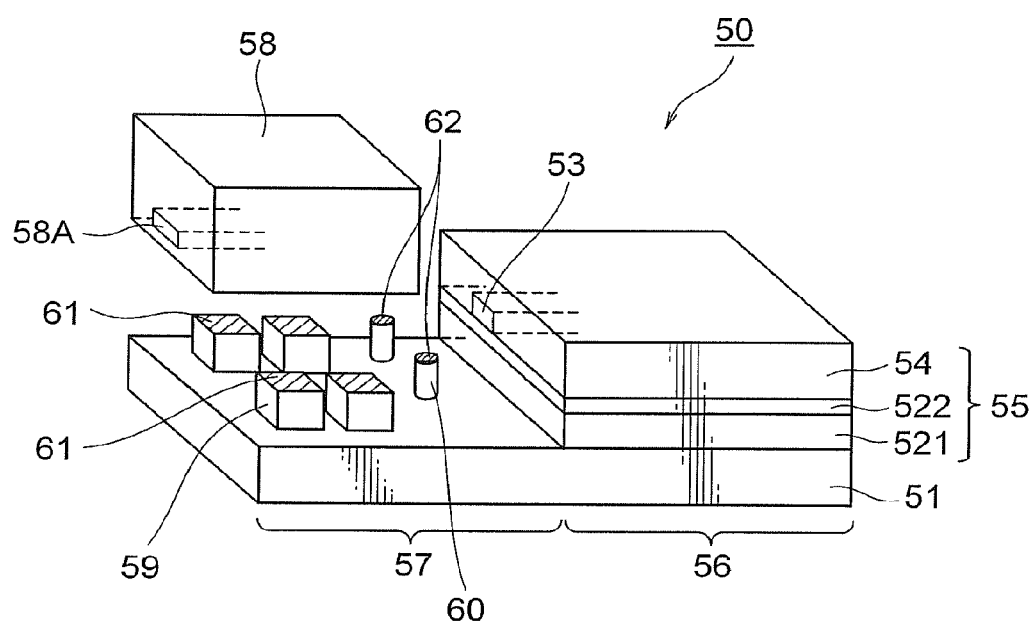
FIG. 12 is an exploded perspective view showing an optical waveguide device of a related art.
Figure 13:
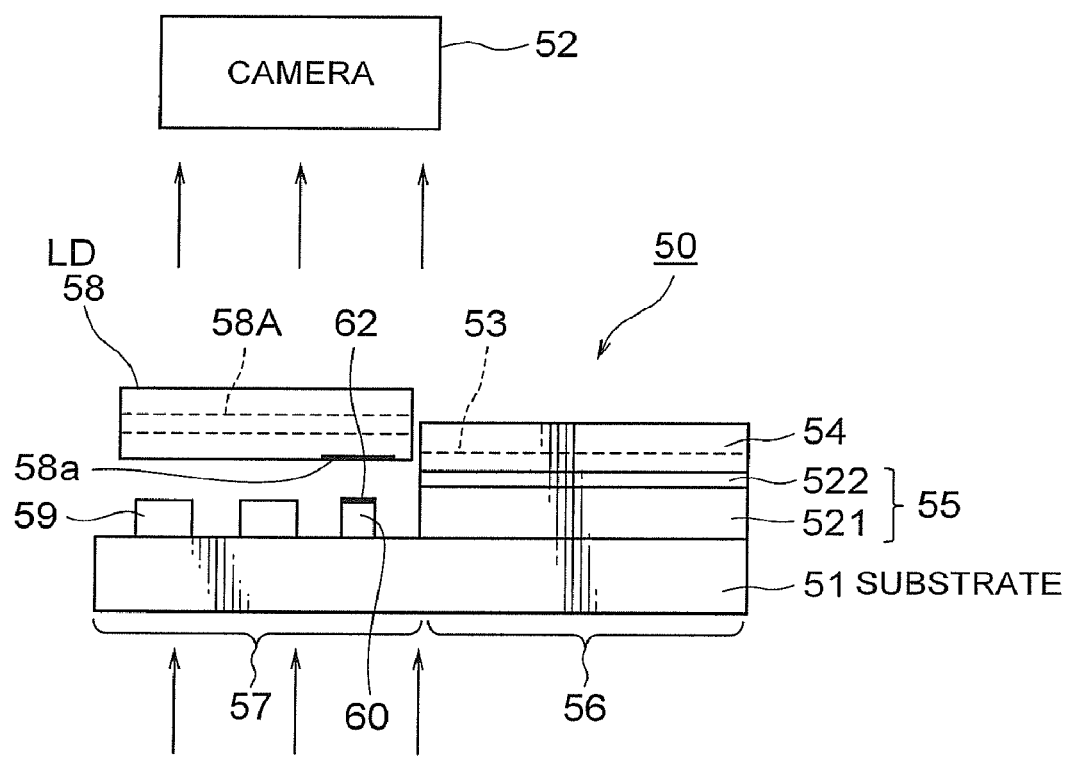
FIG. 13 is an explanatory diagram showing a mounted condition of an optical device which is a result of performance shown in FIG. 12.
Figure 14:
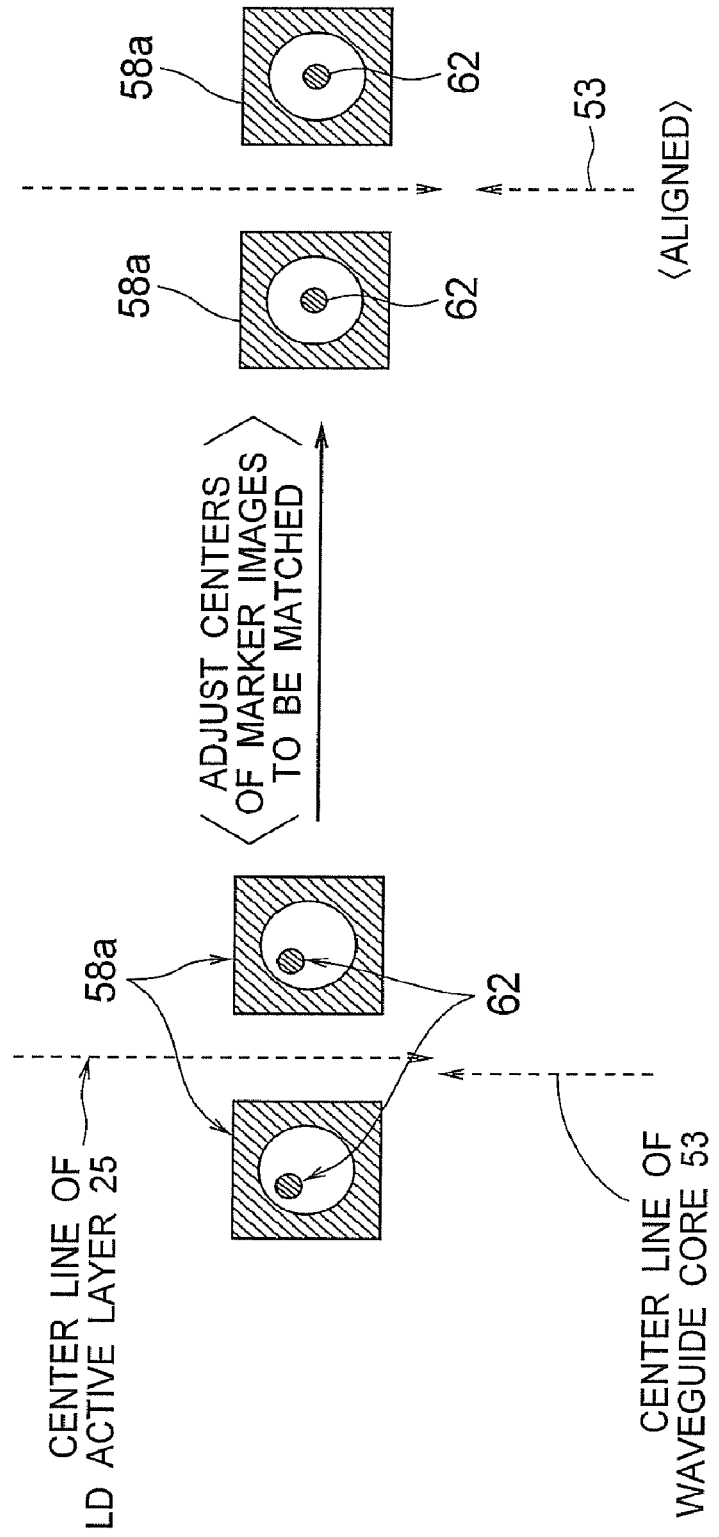
FIG. 14 is an explanatory diagram showing a positional relationship between markers in a case where the optical device is mounted with shifted from a regular mounting position in the optical device mounting of FIG. 12, and where the mounted position is finely adjusted from the misaligned mounting position so that the optical device is transferred to a regular position (where an center axis of an optical waveguide core is matched with an center axis of an LD active layer)

As described above, the optical device 18 is mounted on the optical device mounting area 17 on the substrate 11 with high accuracy and high speed while the LD active layer 25 is exactly aligned with the optical waveguide core 13, according to the fine adjustment in the recognition correction (alignment). Thus, the mounting operations for the optical device 18 are complete (Step S108). FIG. 11 shows a condition where the optical device 18 is mounted completely.

As described above, in this exemplary embodiment, circumferences of the fiducial markers 24A, 24B and the substrate side alignment markers 21A, 21B are recognized by an image and coordinates of each center are detected before the optical device 18 is mounted. In addition, coordinates of the proper positions can be specified for each center of the substrate side alignment markers 21A and 21B according to the position coordinates of the fiducial markers 24A and 24B. Therefore, the differences (dXa, dYa, and dXb, dYb) between those positions and the actual positions of the substrate side alignment markers which are imaged and recognized with the image are detected to be the correction amount for the misalignment.

Moreover, when the optical device 18 is mounted, the optical device 18 is arranged so that the LD side alignment markers 18A and 18B, which are previously provided in the optical device 18 side so as to correspond to the substrate side alignment markers 21A and 21B, are over the actual substrate side alignment markers 21a and 21b, and the optical device 18 is aligned so that centers of each marker are matched. When the centers of marker match with each other, the optical device 18 is transferred by the detected correction amount. Consequently, influence of the misalignment of the substrate alignment markers 21A and 21B can be eliminated. Because both of the right and left LD side alignment markers 18A and 18B move together, actual correction is performed by adjusting X, Y and θ. Thus, optical coupling characteristic can be stabilized dramatically because every chip can be corrected independently and simply.

In the optical device mounting system in the above described exemplary embodiment, a content of information processing performed by the main controller 34 may be programmed in advance, and it may be executed by a computer including the main controller 34. This structure can also achieve the aforementioned object by functioning equivalently with the controller 34.

As described, according to this exemplary embodiment, the regular mounting position of the optical device 18 can be constantly specified especially by the fiducial markers 24A and 24B mounted on the optical waveguide section 15 on the substrate 11. In accordance with the above, the misalignment amount with respect to the mounting position for the optical device 18, caused by a distortion in the optical device mounting area 17 side when the substrate 11 is stressed and distorted, can be specified efficiently before the optical device is mounted. Therefore, the optical device 18 can be arranged and mounted surely at the regular position which is determined to be the position at the time of the substrate being not distorted yet, according to the specified misalignment amount. Thus, the accuracy of mounting can be improved.

At the same time, according to this exemplary embodiment, as described, the misalignment amount of the substrate side alignment markers 21A and 21B in the mounting area 17 corresponding to the optical device 18 are detected before the optical device is mounted, and the detected misalignment amount is determined as the correction amount. Therefore, defective products can be significantly reduced, and productivity can be improved very much. Thus, the excellent waveguide device, optical device mounting system, optical device mounting method, and optical device mounting program which do not have a precedent and are capable of increasing reliability and quality of the optical waveguide device can be presented.

Next, another exemplary embodiment of the invention will be explained. An optical waveguide device according to the exemplary embodiment of the invention may be a hybrid type optical waveguide device where an optical waveguide section including an optical waveguide core is formed on the substrate, and where an optical device section coupled optically with the optical waveguide section is further mounted on the same substrate. In the optical waveguide section, a fiducial marker may be formed for mounting the optical device section at a position corresponding to the optical waveguide core. The fiducial marker and the optical waveguide core may be formed when those are aligned together.

Because the fiducial marker and the waveguide core are aligned together, misalignment between the fiducial marker and the waveguide core does not occur due to the accuracy of the alignment, which is unlike the case in which those are aligned separately. That is, because the fiducial marker is hardly misaligned with the waveguide core, the fiducial marker can function efficiently as an absolute fiducial marker for every other position on the substrate when the optical device is mounted. Thus, the regular position for the optical device to be mounted can be specified.

In this case, one or more fiducial markers may be formed in the right and left sides of the optical waveguide core. Accordingly, two-dimensional alignment can be performed easily and accurately with centering the optical waveguide core.

Further, an optical device side alignment marker may be formed in the optical device section, and a substrate side alignment marker corresponding to the optical device side alignment marker may be formed on the substrate. Accordingly, the optical device can be easily mounted with its position being adjusted while the substrate side alignment marker is used as a target for the position adjustment.

Moreover, one or more optical device side alignment markers may be formed in right and left side of an active layer of the optical device. Accordingly, two-dimensional alignment can be performed easily and accurately with centering the active layer.

In addition, in a process of manufacturing an optical waveguide device according to the exemplary embodiment of the invention, a position for the optical device section to be mounted may be determined based on a position of the fiducial marker formed on the optical waveguide section, and the device section is mounted on the substrate, when the mounting of the device section on the substrate. Accordingly, the regular position for the optical device to be mounted can be specified when the optical device is mounted, even if the optical device side alignment marker is irregularly positioned.

Further, a process may be included in which a difference between a proper position and an actual position of the substrate side alignment marker is determined according to the position of the fiducial marker formed in the optical waveguide section, a positional relationship between the substrate side alignment marker and the optical device side alignment marker is corrected based on the difference, and then the optical device section may be mounted on a position to be placed on the substrate. Accordingly, even if the substrate side alignment marker is not placed at the regular position where it is supposed to be placed properly due to the deformation of the substrate or the like, the substrate side alignment marker can be used as the target for the position adjustment considering the misplacement.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

If a substrate is easily transformed and another component is mounted on the substrate precisely in an apparatus, the exemplary aspect of the invention can be applied to such fine precision apparatus in every field over different subjects. Further, the fiducial marker is not limited in its number and combination. The exemplary aspect of the invention can be applied to variable devices utilizing a PLC technique such as a transceiver device for optical access, a dispersion compensation device, a variable wavelength light source device, a 1-bite delay device for DPSK.

What is claimed is:

1. An optical waveguide device including an optical waveguide section having an optical waveguide core deposited on a substrate and an optical device mounted on the substrate to be optically coupled to the optical waveguide section, the optical waveguide device comprising:
    a first marker to be a reference for a mounting position of the optical device, the first marker formed on a lower cladding layer of the optical waveguide section; and
    a second marker to be a reference for a mounting position of the optical device, the second marker formed on the substrate.

2. The optical waveguide device as claimed in claim 1, wherein the second marker is formed within a region right underneath the optical device.

3. The optical waveguide device as claimed in claim 1, wherein the first marker is formed in the vicinity of the optical waveguide.

4. The optical waveguide device as claimed in claim 1, wherein the second marker is formed on a surface that is substantially same as a top surface of a platform that supports the optical device, in terms of height from the substrate surface.

5. The optical waveguide device as claimed in claim 1, wherein a marker table constituting a bottom section of the first marker and a marker table constituting a bottom section of the second marker are formed, respectively, with a member that is at least same as a part of the optical waveguide section.

6. A manufacturing method of an optical waveguide device including an optical waveguide section having an optical waveguide core deposited on a substrate and an optical device mounted on the substrate to be optically coupled to the optical waveguide section, the optical waveguide device, the method comprising:
    forming a first marker to be a reference for a mounting position of the optical device on a lower cladding layer of the optical waveguide section; and
    forming a second marker to be a reference for a mounting position of the optical device on the substrate.

7. The optical waveguide device manufacturing method as claimed in claim 6, wherein the first marker is formed by performing patterning collectively together with the optical waveguide core.

8. The optical waveguide device manufacturing method as claimed in claim 6, wherein the second marker is formed within a region right underneath the optical device.

9. The optical waveguide device manufacturing method as claimed in claim 6, wherein the first marker is formed in the vicinity of the optical waveguide.

10. The optical waveguide device manufacturing method as claimed in claim 6, wherein the second marker is formed on a surface that is substantially same as a top surface of a platform that supports the optical device, in terms of height from the substrate surface.

11. The optical waveguide device manufacturing method as claimed in claim 10, wherein the second marker is formed by performing patterning collectively together with the platform that supports the optical device.

12. The optical waveguide device manufacturing method as claimed in claim 6, further comprising adjusting a position for mounting the optical device based on a relative positional relationship between the first marker and the second marker.

13. The optical waveguide device manufacturing method as claimed in claim 6, further comprising calculating a correction amount based on a relative positional relationship between the first marker and the second marker, and mounting the optical device at a position shifted by the correction amount from a position having the second marker as a reference.

* * * * *